(12) United States Patent
Suzuki et al.

(10) Patent No.: US 8,199,799 B2
(45) Date of Patent: Jun. 12, 2012

(54) METHOD OF MONITORING CIRCUIT QUALITY AND CIRCUIT THEREFOR

(75) Inventors: Yuuzou Suzuki, Tokyo (JP); Yuzo Kurokami, Tokyo (JP)

(73) Assignee: NEC Corporation, Tokyo (JP)

( * ) Notice: Subject to any disclaimer, the term of this patent is extended or adjusted under 35 U.S.C. 154(b) by 383 days.

(21) Appl. No.: 12/523,021

(22) PCT Filed: Dec. 11, 2007

(86) PCT No.: PCT/JP2007/074189
§ 371 (c)(1),
(2), (4) Date: Jul. 13, 2009

(87) PCT Pub. No.: WO2008/087821
PCT Pub. Date: Jul. 24, 2008

(65) Prior Publication Data
US 2010/0067569 A1 Mar. 18, 2010

(30) Foreign Application Priority Data
Jan. 15, 2007 (JP) ................. 2007-005642

(51) Int. Cl.
*H04B 3/46* (2006.01)
*H04L 7/00* (2006.01)
*G01R 31/08* (2006.01)

(52) U.S. Cl. .................. 375/227; 375/354; 370/244

(58) Field of Classification Search .................. 375/354, 375/355; 370/244
See application file for complete search history.

(56) References Cited

U.S. PATENT DOCUMENTS

| 4,209,843 | A * | 6/1980 | Hyatt | 708/422 |
| 5,410,621 | A * | 4/1995 | Hyatt | 382/260 |
| 6,683,855 | B1 * | 1/2004 | Bordogna et al. | 370/244 |
| 6,765,956 | B1 * | 7/2004 | Gatherer | 375/222 |
| 7,475,299 | B1 * | 1/2009 | Brenes et al. | 714/704 |
| 2002/0067785 | A1 * | 6/2002 | Tanahashi | 375/354 |
| 2005/0048923 | A1 * | 3/2005 | Mohseni et al. | 455/67.11 |
| 2005/0110544 | A1 * | 5/2005 | Suda et al. | 327/165 |
| 2007/0160173 | A1 * | 7/2007 | Takeuchi | 375/355 |

FOREIGN PATENT DOCUMENTS

| JP | 1985144040 A | 7/1985 |
| JP | 1988292851 A | 11/1988 |
| JP | 1993236030 A | 9/1993 |
| JP | 1998145340 A | 5/1998 |
| JP | 1999205211 A | 7/1999 |
| JP | 2002537677 A | 11/2002 |
| JP | 2003230070 A | 8/2003 |
| JP | 2003333627 A | 11/2003 |
| JP | 2004320377 A | 11/2004 |
| JP | 2004349861 A | 12/2004 |
| JP | 2005123870 A | 5/2005 |
| JP | 2006217101 A | 8/2006 |
| JP | 2006246083 A | 9/2006 |

OTHER PUBLICATIONS

International Search Report for PCT/JP2007/074189 mailed Mar. 11, 2008.

* cited by examiner

*Primary Examiner* — David C. Payne
*Assistant Examiner* — Sarah Hassan

(57) ABSTRACT

In a digital wireless communication device having an error correction function, the circuit quality is quickly detected with maintained accuracy. The circuit quality to such an extent that a bit error rate (BER) is slightly degraded ($10^{-10}$ to $10^{-12}$) is quickly detected with maintained accuracy by monitoring the circuit quality based on a C/N error pulse into which C/N information scaling a carrier-to-noise power ratio (C/N) of a received signal has been converted.

6 Claims, 9 Drawing Sheets

METHOD OF MONITORING CIRCUIT QUALITY AND CIRCUIT THEREFOR

This application is the National Phase of PCT/JP2007/074189, filed Dec. 11, 2007, which is based upon and claims priority to Japanese Patent Application No. 2007-005642, filed on Jan. 15, 2007.

TECHNICAL FIELD

The present invention relates to digital wireless communication. More particularly, the present invention relates to technology to monitor circuit quality in a digital wireless communication device having an error correction function.

BACKGROUND ART

Parity check bits have been inserted to data rows of a digital signal at a transmission side for monitoring the circuit quality in a digital wireless communication device. Thus, parity errors have heretofore been detected at a receiving side based on the parity check bits. This type of circuit quality monitoring will be described with reference to FIGS. 1 and 2.

FIGS. 1 and 2 are block diagrams showing an example of a circuit quality monitoring configuration having an error correction function. FIG. 1 shows a transmitting unit, and FIG. 2 shows a receiving unit. The transmitting unit has a parity operation circuit 101, a multiplexer circuit 102, an error correction encoder circuit 103, and a modulation circuit 104. The receiving unit has a demodulation circuit 201, an error correction decoder circuit 202, a separation circuit 203, a parity operation circuit 204, a parity comparison circuit 205, and a circuit alarm initiation circuit 206.

Operation of this circuit quality monitoring configuration will be described. The parity operation circuit 101 in the transmitting unit performs a parity operation on transmission data D in accordance with an algorithm such as even parity or odd parity before parity multiplexing. The multiplexer circuit 102 multiplexes the parity operation results on the transmission data D and outputs the multiplexed data as a transmission signal. The error correction encoder circuit 103 receives from the multiplexer circuit 102 the transmission signal in which the parity has been multiplexed and encodes it. The modulation circuit 104 performs quadrature modulation on the encoded transmission signal and transmits the transmission signal through a wireless transmission line to the counterpart receiving unit.

In the receiving unit, the error correction decoder circuit 202 decodes a received signal demodulated by the demodulation circuit 201. The separation circuit 203 separates the parity operation results, which have been multiplexed in the transmitting unit, from the decoded series of data subjected to error correction. The parity operation circuit 204 performs a parity operation on the series of data subjected to the error correction in accordance with the same algorithm as that used in the transmitting unit. The parity comparison circuit 205 compares the parity operation results which have been obtained from the parity operation circuit 204 with the parity operation results in the transmitting unit which have been separated by the separation circuit 203. The parity comparison circuit 205 generates a parity error pulse ($PU_{PE}$) when the result of the comparison shows disparity. The circuit alarm initiation circuit 206 counts the number of the parity error pulses and initiates a circuit alarm (AL) when the count of the errors within a predetermined alarm initiation interval exceeds an alarm initiation threshold ($TH_M$). Furthermore, after the circuit alarm has been initiated, the circuit alarm initiation circuit 206 releases the circuit alarm (AL) when the count of parity errors within a predetermined alarm release interval is less than an alarm release threshold ($TH_R$).

In this conventional example, when an initiation point of an circuit alarm is to be determined, the initiation threshold and the release threshold used as parameters are set based on the relationship between an occurrence frequency of parity errors and a bit error rate (BER). Therefore, the initiation point depends upon the occurrence probability of parity errors.

Some public documents relating to the present invention are listed as follows:
   Patent Document 1: Japanese laid-open patent publication No. 2004-320377
   Patent Document 2: Japanese laid-open patent publication No. 2006-217101
   Patent Document 3: Japanese laid-open patent publication No. 60-144040
   Patent Document 4: Japanese laid-open patent publication No. 63-292851
   Patent Document 5: Japanese laid-open patent publication No. 05-236030
   Patent Document 6: Japanese laid-open patent publication No. 10-145340

DISCLOSURE OF INVENTION

Problem(s) to be Solved by the Invention

FIG. 3 shows an example in which a BER (bit error rate) is contrasted with a parity error occurrence probability. As shown in FIG. 3, the parity error occurrence probability is proportional to the BER. Assuming that an initiation point of a circuit alarm is set to be a point where $BER=10^{-10}$, a parity error occurrence probability that should be detected by the circuit alarm initiation circuit 206 is $1/10^6$ of a parity error occurrence probability required to be detected in a case where the initiation point is set to be a point where $BER=10^{-3}$. This means that the number of counting parity errors that is required to detect a parity error occurrence probability corresponding to the point where $BER=10^{-10}$ becomes $10^6$ times as large as that required in the case where $BER=10^{-3}$. Specifically, in the aforementioned related art, a monitoring interval for detecting the parity error occurrence probability is increased in order to monitor slight degradation of the circuit quality to such a degree that $BER=10^{-10}$. Thus, the initiation time is problematically delayed.

Such a problem is inevitable in a technique based on the count of error signals to initiate a circuit alarm.

The present invention has been made in view of these problems. It is, therefore, an object of the present invention to provide a circuit quality monitoring method and a circuit for quickly detecting circuit quality with maintained accuracy.

Means to Solve the Problems

One embodiment according to the present invention is characterized in that, in order to monitor circuit quality of a digital wireless communication circuit, a carrier-noise ratio (C/N) of a received signal in a circuit to be monitored is used to generate an error based on a predetermined threshold.

Therefore, for a circuit alarm based on degradation of the circuit quality, a carrier-to-noise power ratio (C/N) of a received signal is first estimated, and an error is generated when the estimated carrier-to-noise power ratio is less than a predetermined threshold. Next, those generated errors are counted within a predetermined monitoring interval, and an error pulse is generated when the resultant count exceeds a predetermined threshold. Then an alarm is initiated based on those generated error pulses.

EFFECT(S) OF THE INVENTION

According to the present invention, a C/N error pulse obtained from C/N information is used as an error pulse for initiating a circuit alarm. This is because the circuit quality is degraded by influence from thermal noise generated in a wireless communication device when a signal transmission is performed within a wireless network. Because the distribution of the thermal noise generated conforms to the Gaussian distribution, a ratio of the carrier to the noise power (C/N) is represented by the Gaussian distribution. There is a method of calculating an average C/N in order to generate a C/N alarm from a C/N of the Gaussian distribution. However, a method of monitoring the circuit quality based on results obtained by comparing the calculation result with a threshold would require a long period of time to enhance the detection precision of circuit degradation to a desired level. Therefore, the determination is difficult to be made within a short period of time. Thus, instead of calculating an average C/N, a C/N value derived for each symbol is first compared with a threshold to thereby generate a C/N error ($ER_{CN}$). Then a C/N error pulse ($PU_{CN}$) is generated from the occurrence probability distribution of those C/N errors, so that the circuit quality can be monitored by error pulses of any probability and rate.

The present invention employs a C/N error pulse generated by comparing the number of C/N errors generated within a predetermined monitoring interval with a threshold. Accordingly, the error pulse occurrence probability can be adjusted as desired by setting a monitoring interval and a generation threshold for generating a C/N error pulse. As a result, while the detection precision of BERs is maintained, even slight circuit degradation to such a degree that the BER is about $10^{-10}$ can be detected more quickly as compared to the aforementioned related method. Furthermore, according to the present invention, no redundant signal to initiate a circuit alarm needs to be added to a transmission signal. Therefore, the present invention is also more effective in transmission efficiency as compared to the aforementioned related art using parity.

BEST MODE FOR CARRYING OUT THE INVENTION

The best mode for carrying out the present invention will be described below with reference to the drawings.

Embodiment 1

Figure 4:
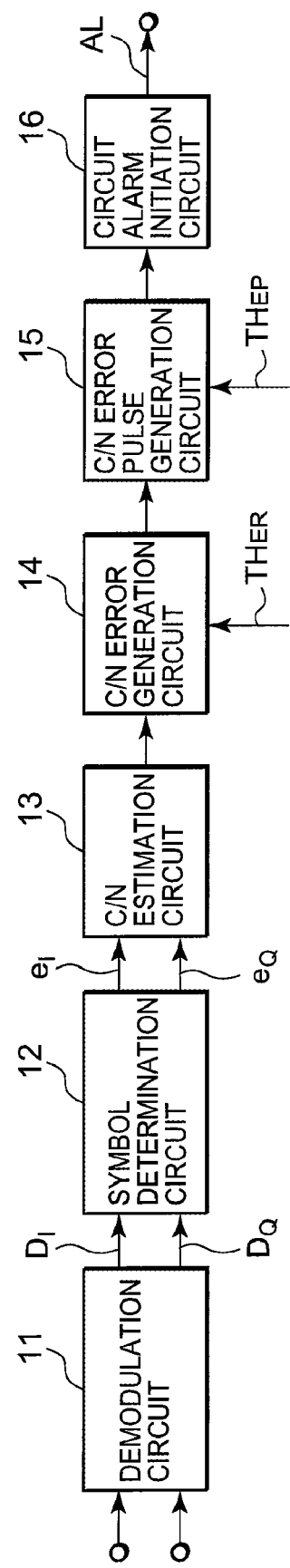
FIG. 4 is a diagram showing a circuit quality monitoring circuit according to a first embodiment of the present invention in a block form.

FIG. 4 is a configurational block diagram showing a first embodiment according to the present invention. In this embodiment, it is assumed that a quadrature modulation system such as QPSK (Quadrature Phase Shift Keying) or QAM (Quadrature Amplitude Modulation) is used as a digital modulation system. Therefore, this embodiment uses symbols Ich and Qch, which are generally used to represent quadrature base-band components.

This circuit quality monitoring circuit includes a C/N (Carrier-Noise Ratio) estimation circuit 13, a C/N error generation circuit 14, a C/N error pulse generation circuit 15, and a circuit alarm initiation circuit 16, which are features of the present invention and are connected in series to a demodulation circuit 11 and a symbol determination circuit 12.

The demodulation circuit 11 performs quadrature detection on a received signal that has arrived via a wireless transmission line. The symbol determination circuit 12 performs symbol determination on the signal that has been subjected to quadrature detection and inputted from the demodulation circuit 11. The C/N estimation circuit 13 estimates a C/N of the received signal from the output of the symbol determination circuit 12. The C/N error generation circuit 14 generates an error ($ER_{CN}$) when the estimated C/N is less than a predetermined threshold ($TH_{ER}$). The C/N error pulse generation circuit 15 counts errors ($ER_{CN}$) generated by the C/N error generation circuit 14 within a predetermined monitoring interval and generates an error pulse ($PU_{CN}$) when the resultant count exceeds a predetermined threshold ($TH_{EP}$). The circuit alarm initiation circuit 16 initiates a circuit alarm (AL) based on the error pulses generated by the C/N error pulse generation circuit 15.

Figure 1:
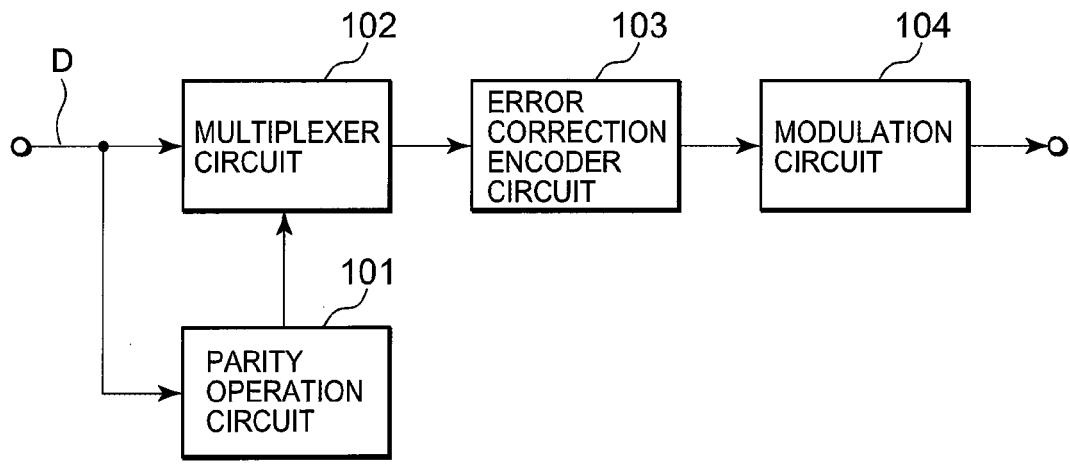
FIG. 1 is a diagram showing a configurational example of a transmitting unit in a related block configuration for monitoring circuit quality.
Figure 2:
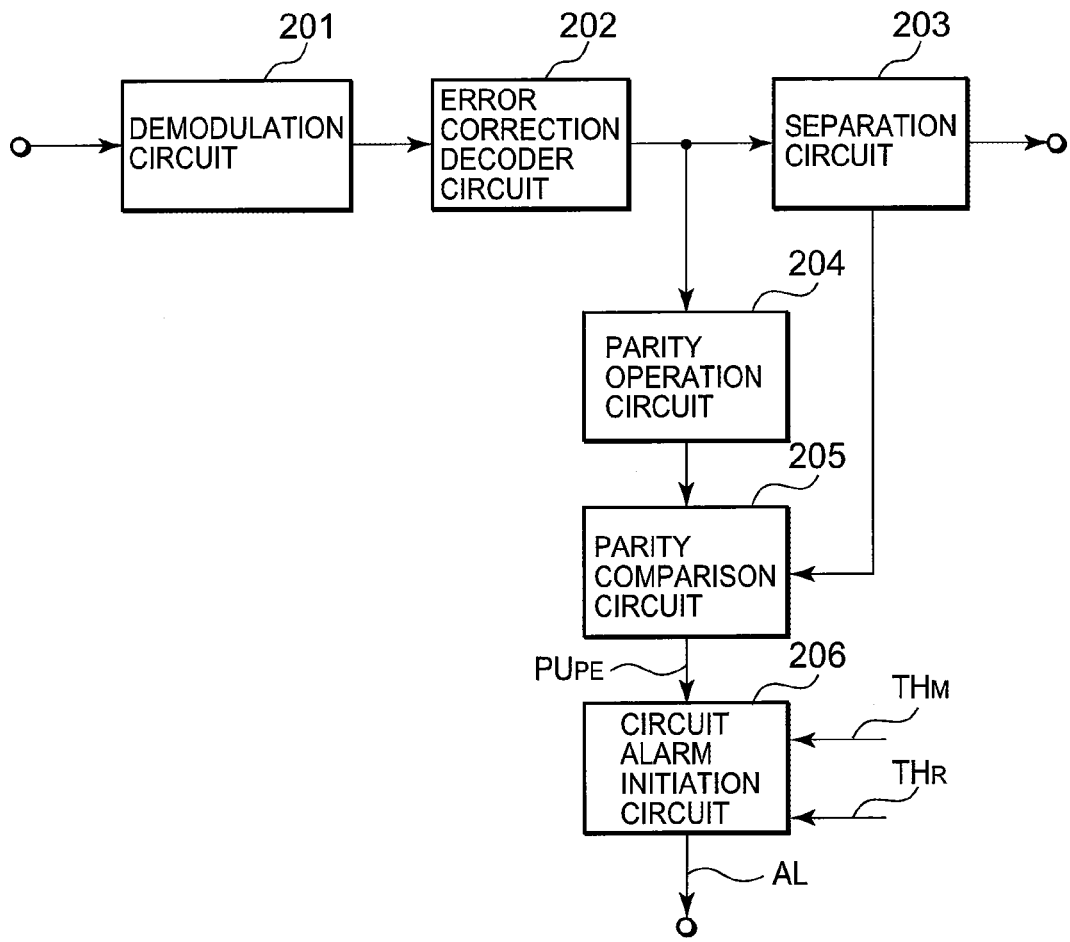
FIG. 2 is a diagram showing a configurational example of a receiving unit in a related block configuration for monitoring circuit quality.
Figure 3:
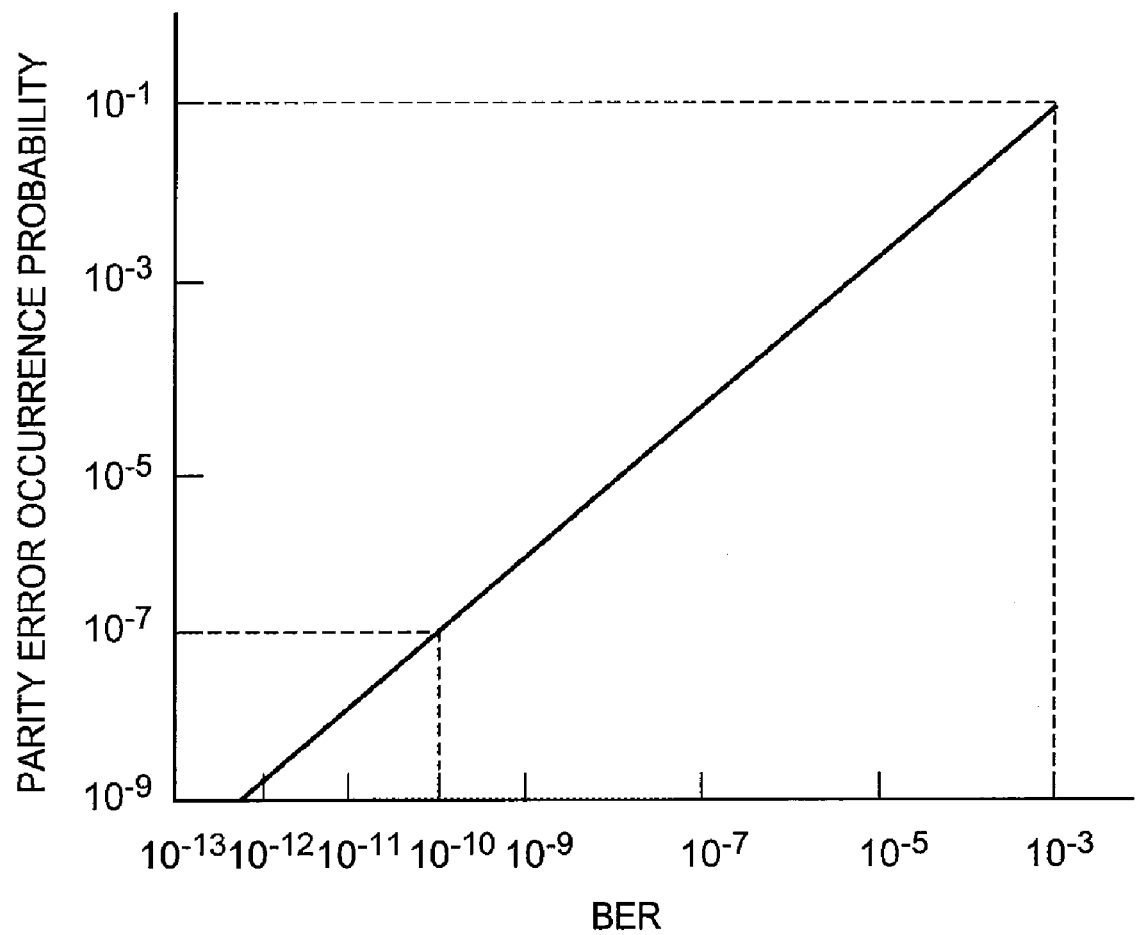
FIG. 3 is a graph showing an example of parity error occurrence probabilities with respect to BERs.

Thus, a received signal that has arrived via a wireless transmission line is first subjected to quadrature detection in the demodulation circuit 11. The symbol determination circuit 12 performs symbol determination on the input signal that has been subjected to quadrature detection (Ich component $D_I$ and Qch component $D_Q$). Specifically, an Ich component and a Qch component of a symbol determination value are subtracted respectively from the component $D_I$ and the component $D_Q$ to calculate an error signal (Ich component $e_I$ and Qch component $e_Q$). An instantaneous power of the error signal at the symbol determination point is calculated by a root mean square of the component $e_I$ and the component $e_Q$. Furthermore, a C/N estimate is derived from division of a known average signal power, which is calculated based on the location of a lattice point of a modulating signal, and the instantaneous power of the error signal. The C/N estimation circuit 13 has an operation table that allows a C/N estimate to be derived in accordance with the aforementioned algorithm by assigning the component $e_I$ and the component $e_Q$. That is, a C/N estimate is derived from the table and outputted by the C/N estimation circuit 13. The C/N error generation circuit 14 compares the C/N estimate with a C/N error threshold ($TH_{ER}$) and outputs a C/N error ($ER_{CN}$) when the C/N error estimate is less than the threshold. The C/N error pulse generation circuit 15 counts the number of C/N errors outputted within a predetermined monitoring interval. The resultant count is compared with a C/N error pulse threshold ($TH_{EP}$). When the count reaches the threshold, a C/N error pulse ($PU_{CN}$) is generated. The circuit alarm initiation circuit 16 has functions equivalent to those of the circuit alarm initiation circuit 206 shown in FIG. 2. Therefore, the circuit alarm initiation circuit 16 compares the number of C/N error pulses within an alarm initiation monitoring interval with a predetermined threshold and initiates a circuit alarm (AL) when the number of the C/N error pulses reaches the threshold.

Next, operations from generation of a C/N error pulse to initiation of a circuit alarm, which are features of the present invention, will be described below. Processes of estimation of a C/N and derivation of C/N degradation have been known in the art (see Patent Document 1), and the explanation of those processes are omitted herein. In the following description, it is assumed that derivation of C/N degradation is equivalent to derivation of a C/N error, that an occurrence probability of a C/N error is p, that an error pulse occurrence threshold is N, and that the number of C/N errors in an error pulse occurrence monitoring interval is M. Since a C/N error is derived based on information of one symbol of a received signal subjected to detection, the maximum error occurrence ratio is equal to a symbol rate.

The C/N error pulse generation circuit 15 counts not only C/N errors ($ER_{CN}$) but also counting timer pulses, which are generated at a symbol rate in synchronism with the C/N errors, in order to extract the error pulse occurrence monitoring interval. When the count of the counting timer pulses reaches M, the C/N error pulse generation circuit 15 compares the count of the C/N errors with the threshold N to generate a C/N error pulse. At the same time, the C/N error pulse generation circuit 15 resets the counts of the C/N errors and the counting timer pulses to zero. Using the C/N error occurrence probability (p), the C/N error pulse occurrence probability ($P_{CN}$) is represented by the following binomial distribution formula (1).

$$P_{CN} = \Sigma P^k (1-p)^{M-k} \quad (1)$$

where $\Sigma$ is the sum total of k (=N to M).

By using as parameters the threshold N and the occurrence monitoring interval M shown in the above formula (1), characteristics of $P_{CN}$ to BERs can be adjusted as desired. Nevertheless, if the amount of change of $P_{CN}$ to BERs is excessively increased with priority to the detection precision of BERs when the parameters are selected, then the error pulse initiation probability is lowered with regard to low-BER detection. As a result, a period of time required for alarm detection is lengthened. Conversely, if the amount of change of $P_{CN}$ to BERs is excessively reduced, the detection precision of BERs is deteriorated. Accordingly, the parameters should be selected properly in consideration of a trade-off between the initiation period for a circuit alarm and the detection precision.

Figure 5:
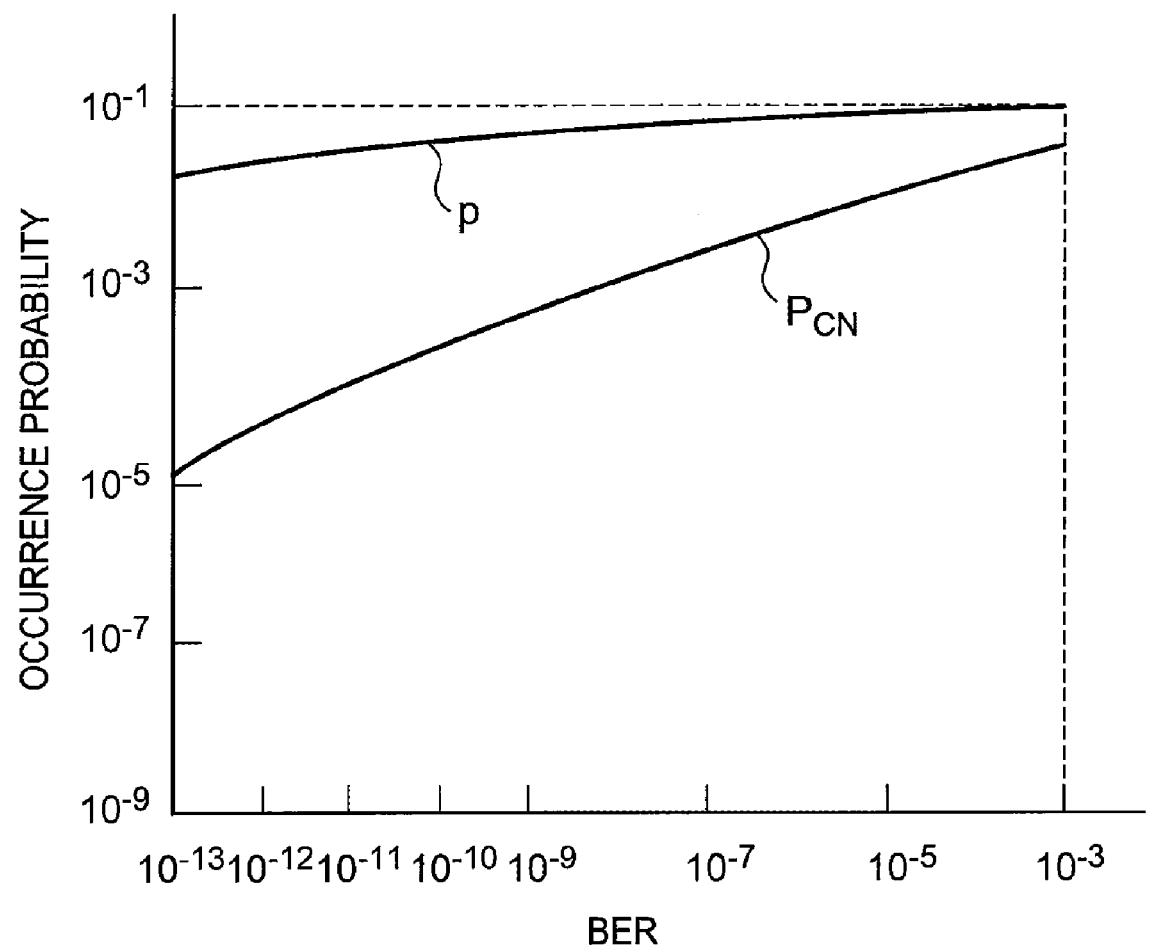
FIG. 5 is a graph showing an example of C/N error occurrence probabilities (p) and C/N error pulse occurrence probabilities ($P_{CN}$) with respect to BERs.

FIG. 5 shows an example of the C/N error occurrence probabilities (p) and the C/N error pulse occurrence probabilities ($P_{CN}$) with respect to the BERs in a digital wireless communication device having error correction. The C/N error occurrence probabilities (p) are almost constant irrespective of the BERs. The C/N error pulse occurrence probabilities ($P_{CN}$) change to such a degree that the detection precision is not lowered for a desired BER. Furthermore, unlike the related art, the error pulse occurrence probabilities ($P_{CN}$) are not proportional to the BERs. Accordingly, the error pulse occurrence probabilities ($P_{CN}$) required for low-BER detection can readily be set as desired.

Next, the circuit alarm initiation circuit 16 will be described. The operation of this circuit is the same as that in the related art. The number of C/N error pulses generated within a certain alarm initiation monitoring interval is extracted and compared with a threshold to initiate an alarm. It is assumed here that an alarm initiation threshold for setting an alarm initiation point is N' and that the number of C/N error pulses in an alarm initiation monitoring interval is M'. The circuit alarm initiation probability ($P_{BER}$) is represented by the following binomial distribution formula (2).

$$P_{BER} = \Sigma P_{CN}^k (1-P_{CN})^{M'-k} \quad (2)$$

where $\Sigma$ is the sum total of k (=N' to M').

Thus, the present invention has features in that probability calculation that conforms to the binomial distribution is successively performed in a C/N error pulse generation process and a circuit alarm initiation process.

Figure 6:
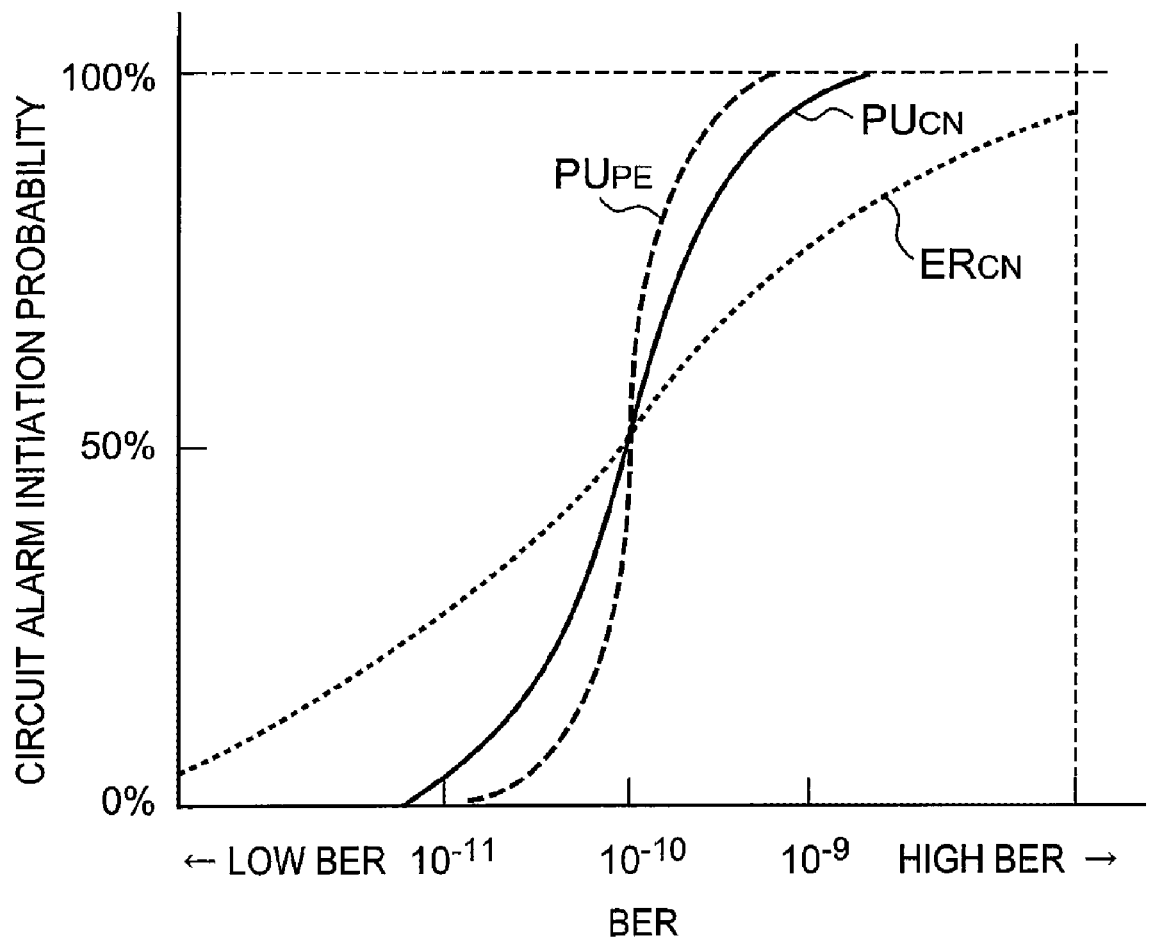
FIG. 6 is a graph showing examples of circuit alarm initiation probabilities with respect to BERs in cases where C/N errors ($ER_{CN}$), C/N error pulses ($PU_{CN}$), and parity error pulses ($PU_{PE}$) are used respectively.
Figure 7:
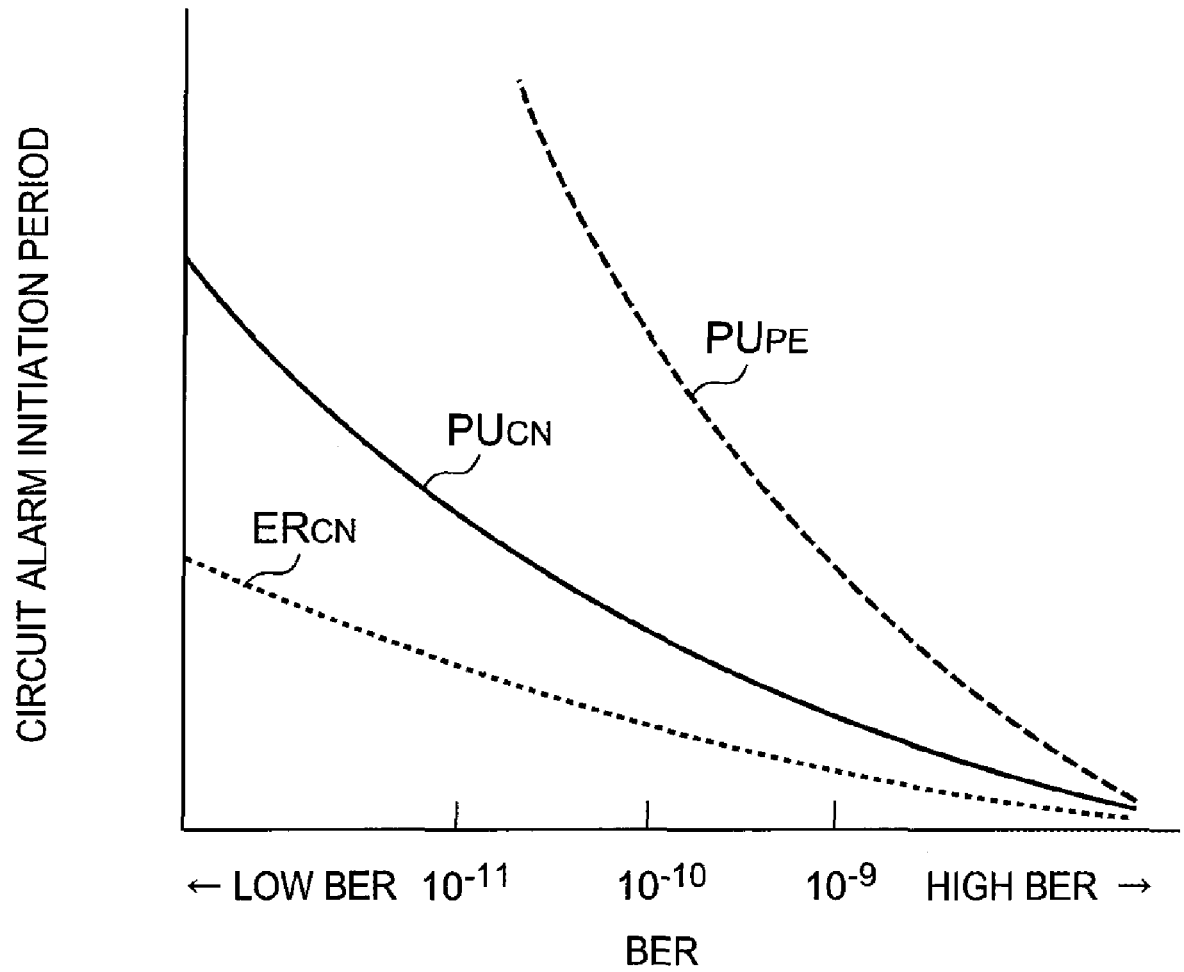
FIG. 7 is a graph showing examples of circuit alarm initiation periods with respect to BERs in cases where C/N errors ($ER_{CN}$), C/N error pulses ($PU_{CN}$), and parity error pulses ($PU_{PE}$) are used respectively.

FIG. 6 is a graph showing an example of circuit alarm initiation probabilities, in which C/N error pulses ($PU_{CN}$), C/N errors ($ER_{IN}$), and parity error pulses ($PU_{PE}$) are respectively used as error pulses for circuit alarm initiation. Furthermore, FIG. 7 shows an example of circuit alarm initiation periods in cases where C/N error pulses ($PU_{CN}$), C/N errors ($ER_{CN}$), and parity error pulses ($PU_{PE}$) are used. It is assumed that the alarm initiation point is set at a low BER where BER=$10^{-10}$. As is apparent from FIGS. 6 and 4, when C/N errors are used, the circuit alarm initiation probability where BER=$10^{-10}$ is almost equal to the initiation probability where BER=$10^{-9}$ or BER=$10^{-11}$. Therefore, the detection precision of BERs is bad. In the related art using parity errors, while the detection precision of BERs is good, the error pulse occurrence probabilities tend to be proportional to the BERs. Thus, the error pulse occurrence probability required for low-BER detection is extremely lowered. Accordingly, the circuit alarm initiation period becomes long. In the case using C/N error pulses according to the present invention, while the precision of the circuit alarm initiation probabilities is maintained, the error pulse occurrence probabilities can be adjusted to be high at a low BER as compared to the related art. Therefore, the alarm initiation period is shortened by such adjustment.

With a circuit quality monitoring circuit using parity errors in the related art, the occurrence probabilities of error pulses depend upon BERs. Therefore, there is little flexibility with regard to an initiation point and an initiation period for a circuit alarm. In contrast, according to the present embodiment using C/N error pulses, the occurrence probabilities of error pulses can be set irrespective of BERs. Accordingly, there is a high degree of flexibility with regard to an initiation point and an initiation period for a circuit alarm, and the initiation period for a circuit alarm can be shortened to a large extent.

Embodiment 2

Figure 8:
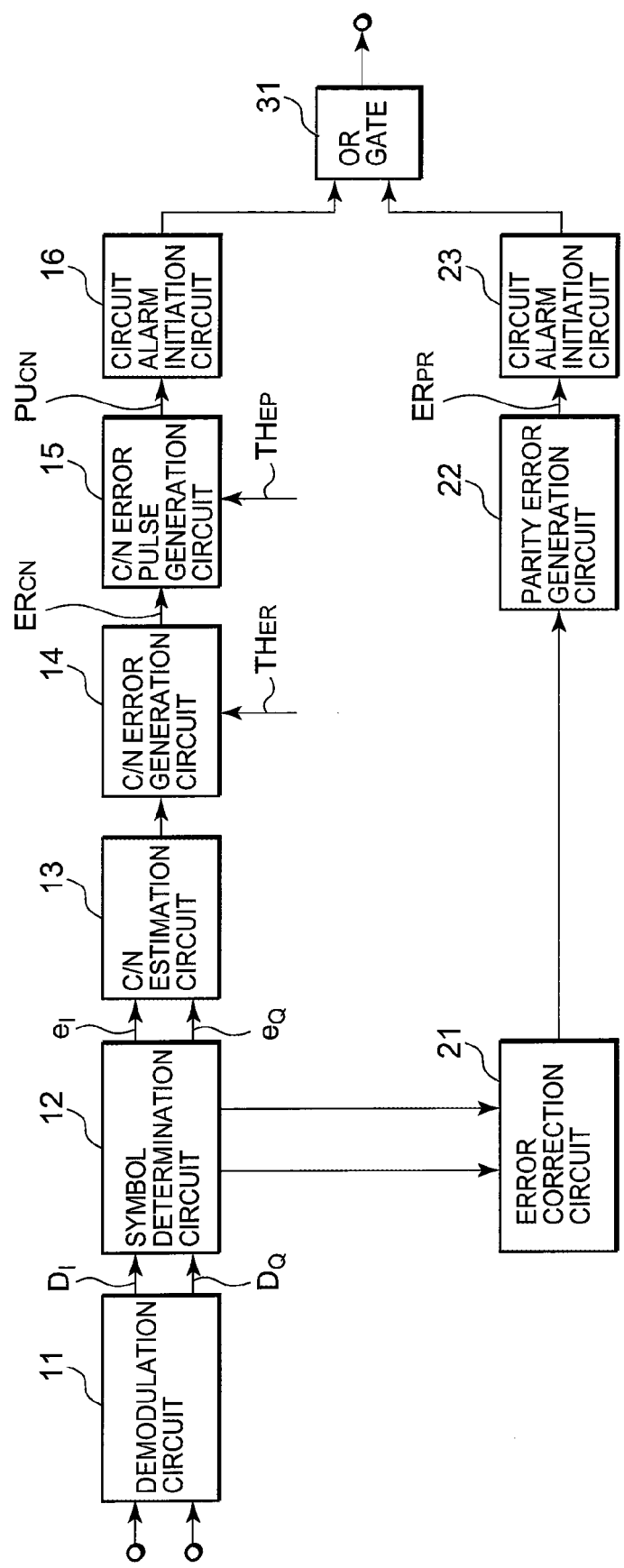
FIG. 8 is a diagram showing a circuit quality monitoring circuit according to a second embodiment of the present invention in a block form.

FIG. 8 is a diagram showing a block configuration of a second embodiment of the present invention. This embodiment includes an error correction circuit 21, a parity error generation circuit 22, a circuit alarm initiation circuit 23, and an OR gate 31, which can be implemented by well-known art, in addition to the components in the embodiment shown in FIG. 4, which are features of the present invention. In FIG. 8, components denoted by the same reference numerals as in FIG. 4 have the same functions as in FIG. 4. Therefore, the explanation of those components is omitted herein. The error correction circuit 21 receives an output of a symbol determination circuit 12, decodes it into a received signal including parity, and outputs the received signal to the parity error generation circuit 22. The parity error generation circuit 22 performs a parity operation based on a signal outputted from the error correction circuit 21, detects and generates a parity error ($ER_{PR}$), and outputs it to the circuit alarm initiation circuit 23. The circuit alarm initiation circuit 23 receives parity errors ($ER_{PR}$) generated from the parity error generation circuit 22, counts the parity error pulses, and initiates an alarm when the count of the errors within a predetermined alarm initiation interval exceeds an alarm initiation threshold. The OR gate 31 implements the logical OR operation of alarms obtained respectively from the two circuit alarm initiation circuits 16 and 23 to output a circuit alarm (AL).

In a fading environment, because a received signal is influenced by nonlinear distortion, the relationship of C/N with BER is different from that in a case where white Gaussian noise is added. Therefore, C/N error pulses ($PU_{CN}$) may not be generated as expected. Particularly, if the circuit quality is drastically degraded by fast fading or the like, no C/N error pulses may be generated and no circuit alarms may be initiated. On the other hand, because a circuit alarm using parity errors ($ER_{PR}$) can be initiated with certainty even if BERs are deteriorated, there is no fear that an alarm would be unlikely to be initiated under the influence of fading. If an alarm initiation threshold is set at a high BER of about $10^{-3}$ even in a case using parity errors, then detection of line degradation can be performed without much time. From the viewpoint of the above, use of a circuit alarm using parity error pulses and a circuit alarm using C/N error pulses provides more effective detection of line degradation.

Embodiment 3

Figure 9:
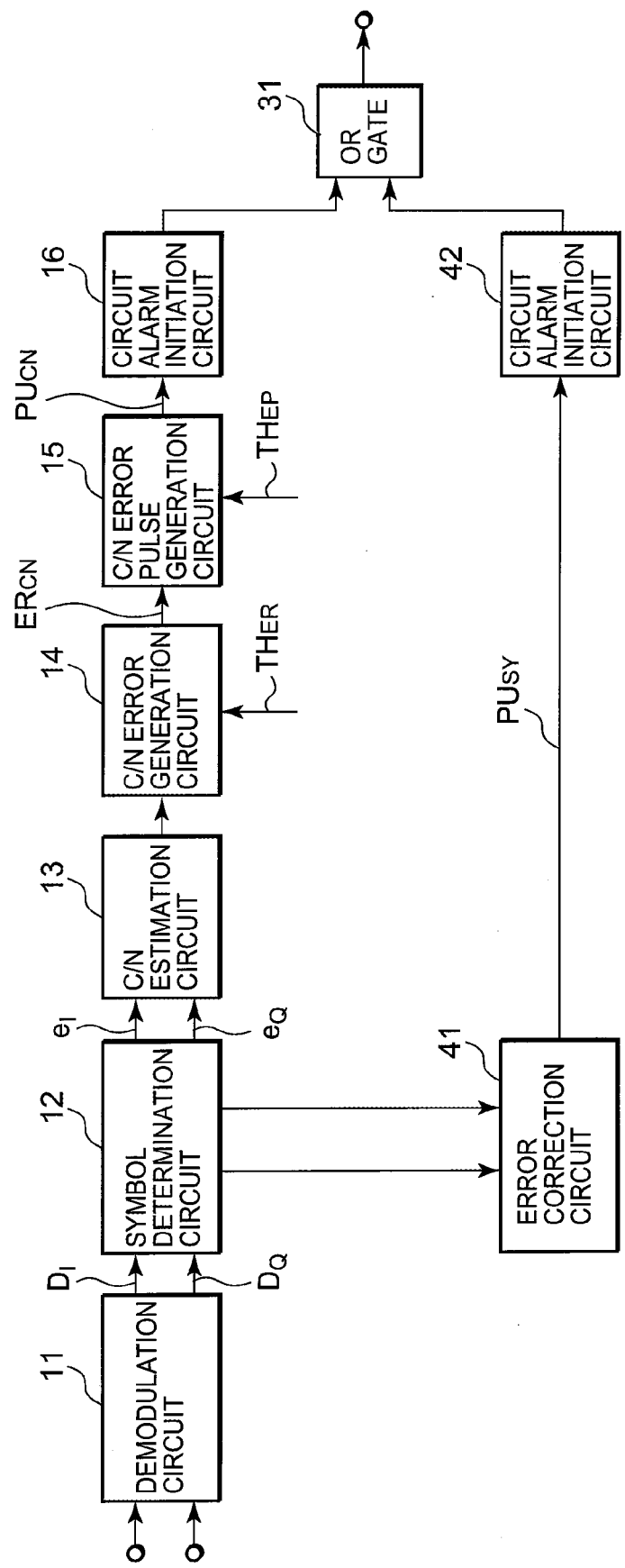
FIG. 9 is a diagram showing a circuit quality monitoring circuit according to a third embodiment of the present invention in a block form.

FIG. 9 is a diagram showing a block configuration of a third embodiment of the present invention. This embodiment includes an error correction circuit 41, a circuit alarm initiation circuit 42, and an OR gate 31, which can be implemented by well-known art, in addition to the components in the embodiment shown in FIG. 4, which are features of the present invention. Components denoted by the same reference numerals as in FIGS. 4 and 8 have the same functions as in FIGS. 4 and 8. Therefore, the explanation of those components is omitted herein. The error correction circuit 41 receives an output of a symbol determination circuit 12, counts syndrome errors of error correction codes generated within a predetermined period of time when errors are detected, and generates a syndrome error pulse ($PU_{SY}$). The pulse is outputted to the circuit alarm initiation circuit 42. The circuit alarm initiation circuit 42 receives the syndrome error pulse ($PU_{SY}$) generated by the error correction circuit 41 and counts those pulses. The circuit alarm initiation circuit 42 initiates an alarm when the count of the errors within a predetermined alarm initiation interval exceeds an alarm initiation threshold. The OR gate 31 implements the logic OR operation of alarms obtained from the two circuit alarm initiation circuits 16 and 42 to output a circuit alarm (AL).

Embodiment 4

Figure 10:
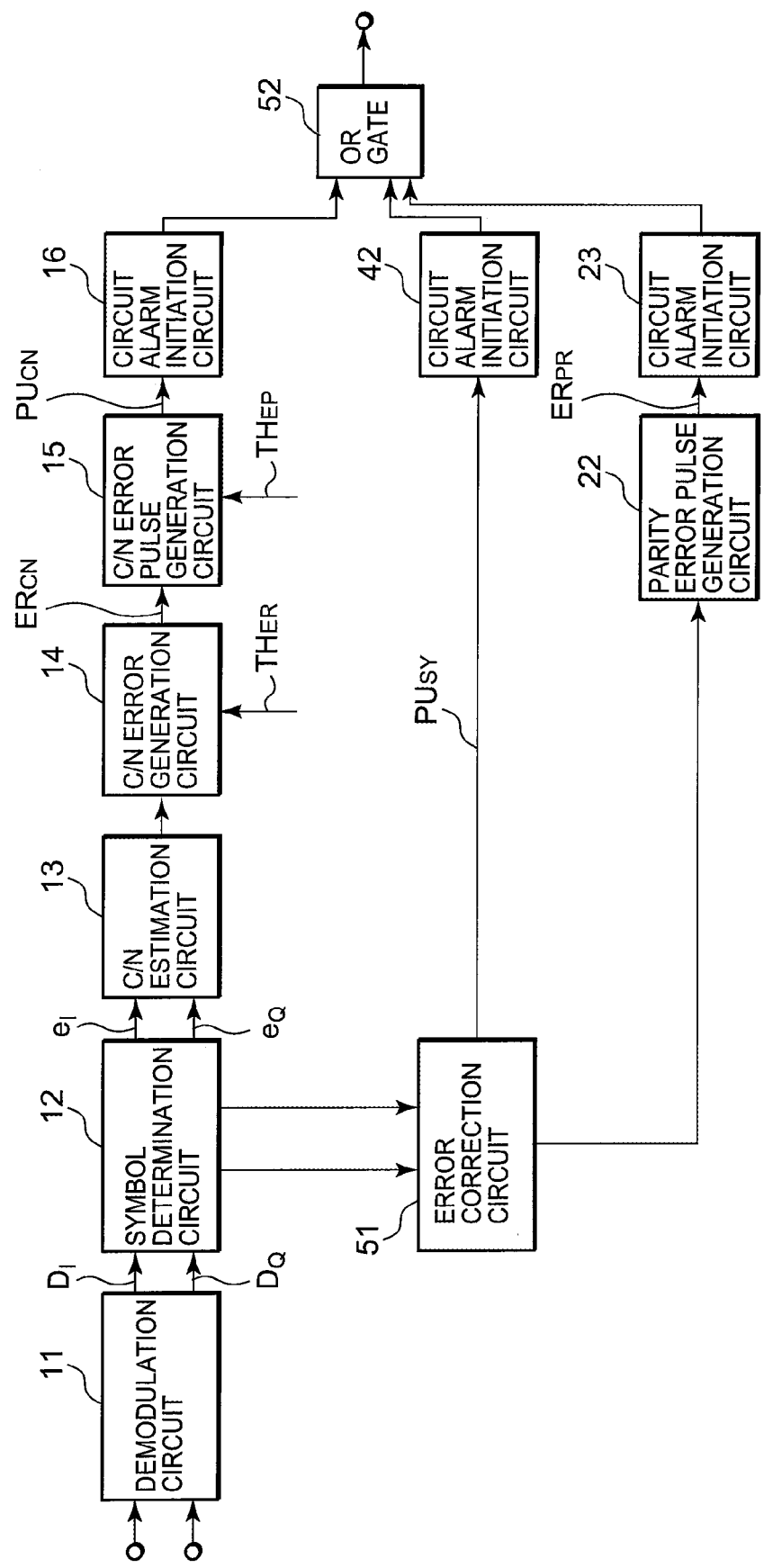
FIG. 10 is a diagram showing a circuit quality monitoring circuit according to a fourth embodiment of the present invention in a block form.

FIG. 10 is a diagram showing a block configuration of a fourth embodiment of the present invention. This embodiment combines Embodiments 2 and 3 with each other. Specifically, except an error correction circuit 51 and an OR gate 52, components denoted by the same reference numerals in FIGS. 8 and 9 have the same functions as in FIGS. 8 and 9. Therefore, the explanation of those components having the same functions is omitted herein. The error correction circuit 51 receives an output of the symbol determination circuit 12, decodes it into a received signal including parity, and outputs the received signal to the parity error generation circuit 22. At the same time, the error correction circuit 51 counts syndrome errors of error correction codes and generates a syndrome error pulse ($PU_{SY}$). The OR gate 52 implements the logical OR operation of alarms obtained from the three circuit alarm initiation circuits 16, 23, and 42 to output a circuit alarm (AL).

The invention claimed is:

1. A method of monitoring circuit quality of a digital wireless communication circuit, comprising:
   first estimating a carrier-to-noise power ratio of a signal received from a wireless communication circuit;
   generating a first error when the estimated carrier-to-noise power ratio is less than a predetermined first threshold;
   counting first errors generated within a predetermined monitoring interval;
   generating a first error pulse when the resultant count exceeds a predetermined second threshold;
   initiating an alarm based on the generated first error pulse;
   counting parity errors of the signal received from the wireless communication circuit within a predetermined monitoring interval;
   generating a second error pulse when a resultant count of the counting parity errors exceeds an alarm initiation threshold; and
   initiating an alarm based on the generated second error pulse.

2. A method of monitoring circuit quality of a digital wireless communication circuit, comprising:
   first estimating a carrier-to-noise power ratio of a signal received from a wireless communication circuit;
   generating a first error when the estimated carrier-to-noise power ratio is less than a predetermined first threshold;
   counting first errors generated within a predetermined monitoring interval;
   generating a first error pulse when the resultant count exceeds a predetermined second threshold;
   initiating an alarm based on the generated first error pulse;
   counting syndrome errors of the signal received from the wireless communication circuit within a predetermined monitoring interval;
   generating a different error pulse when a resultant count of the counting syndrome errors exceeds an alarm initiation threshold; and
   initiating an alarm based on the generated different error pulse.

3. A method of monitoring circuit quality of a digital wireless communication circuit, comprising:
   first estimating a carrier-to-noise power ratio of a signal received from a wireless communication circuit;
   generating a first error when the estimated carrier-to-noise power ratio is less than a predetermined first threshold;
   counting first errors generated within a predetermined monitoring interval;
   generating a first error pulse when the resultant count exceeds a predetermined second threshold;
   initiating an alarm based on the generated first error pulse;
   counting parity errors of the signal received from the wireless communication circuit within a first predetermined monitoring interval;
   generating a second error pulse when a resultant count of the counting parity errors exceeds first alarm initiation threshold;
   initiating an alarm based on the generated second error pulse;
   counting syndrome errors of the signal received from the wireless communication circuit within a second predetermined monitoring interval;

generating a different error pulse when a resultant count of the counting syndrome errors exceeds a second alarm initiation threshold; and initiating the alarm based on the generated different error pulse.

4. A circuit for monitoring circuit quality of a digital wireless communication circuit, comprising:

a C/N estimation circuit that estimates a carrier-to-noise power ratio (C/N) of a signal received from the wireless communication circuit;

a C/N error generation circuit that generates a first error when the estimated carrier-to-noise power ratio is less than a predetermined first threshold;

a first error pulse generation circuit that counts first errors generated within a predetermined monitoring interval and generates a first error pulse when the resultant count exceeds a predetermined second threshold;

a first circuit alarm initiation circuit that initiates an alarm based on the generated first error pulse;

a second error pulse generation circuit that counts parity errors of the received signal within a predetermined monitoring interval and generates a second error pulse when a resultant count of the counting parity errors exceeds an alarm initiation threshold; and a second circuit alarm initiation circuit that initiates an alarm based on the second error pulse.

5. A circuit for monitoring circuit quality of a digital wireless communication circuit, comprising:

a C/N estimation circuit that estimates a carrier-to-noise power ratio (C/N) of a signal received from the wireless communication circuit;

a C/N error generation circuit that generates a first error when the estimated carrier-to-noise power ratio is less than a predetermined first threshold;

a first error pulse generation circuit that counts first errors generated within a predetermined monitoring interval and generates a first error pulse when the resultant count exceeds a predetermined second threshold;

a first circuit alarm initiation circuit that initiates an alarm based on the generated first error pulse;

a different error pulse generation circuit that counts syndrome errors of the received signal within a predetermined monitoring interval and generates a second different error pulse when a resultant count of the counting syndrome errors exceeds an alarm initiation threshold; and a different circuit alarm initiation circuit that initiates an alarm based on the different error pulse.

6. A circuit for monitoring circuit quality of a digital wireless communication circuit, comprising:

a C/N estimation circuit that estimates a carrier-to-noise power ratio (C/N) of a signal received from the wireless communication circuit;

a C/N error generation circuit that generates a first error when the estimated carrier-to-noise power ratio is less than a predetermined first threshold;

a first error pulse generation circuit that counts first errors generated within a predetermined monitoring interval and generates a first error pulse when the resultant count exceeds a predetermined second threshold;

a first circuit alarm initiation circuit that initiates an alarm based on the generated first error pulse;

a second error pulse generation circuit that counts parity errors of the received signal within a first predetermined monitoring interval and generates a second error pulse when a resultant count exceeds a first alarm initiation threshold;

a second circuit alarm initiation circuit that initiates an alarm based on the second error pulse;

a different error pulse generation circuit that counts syndrome errors of the received signal within a second predetermined monitoring interval and generates a different error pulse when a resultant count of the counting syndrome errors exceeds a second alarm initiation threshold; and a different circuit alarm initiation circuit that initiates the alarm based on the different error pulse.

\* \* \* \* \*